US007721281B1

(12) United States Patent
Cherepov et al.

(10) Patent No.: US 7,721,281 B1
(45) Date of Patent: May 18, 2010

(54) METHODS AND APPARATUS FOR SECURING LOCAL APPLICATION EXECUTION

(75) Inventors: Mikhail Cherepov, Lexington, MA (US); Richard C. Gorton, Jr., Framingham, MA (US)

(73) Assignee: Cisco Technology, Inc., San Jose, CA (US)

( * ) Notice: Subject to any disclaimer, the term of this patent is extended or adjusted under 35 U.S.C. 154(b) by 1129 days.

(21) Appl. No.: 11/173,533

(22) Filed: Jul. 1, 2005

(51) Int. Cl.
*G05F 9/445* (2006.01)
*G06F 9/44* (2006.01)

(52) U.S. Cl. .................. 717/174; 717/171; 717/172

(58) Field of Classification Search .......... 717/170–178
See application file for complete search history.

(56) References Cited

U.S. PATENT DOCUMENTS

| | | | | |
|---|---|---|---|---|
| 5,642,417 | A * | 6/1997 | Stringer .................. | 717/174 |
| 6,006,035 | A * | 12/1999 | Nabahi .................. | 717/175 |
| 6,279,030 | B1 * | 8/2001 | Britton et al. ........... | 709/203 |
| 6,345,386 | B1 * | 2/2002 | Delo et al. .............. | 717/176 |
| 6,493,871 | B1 * | 12/2002 | McGuire et al. .......... | 717/173 |
| 6,606,744 | B1 * | 8/2003 | Mikurak ................ | 717/174 |
| 6,675,382 | B1 * | 1/2004 | Foster .................. | 717/177 |
| 6,681,391 | B1 * | 1/2004 | Marino et al. ........... | 717/175 |
| 6,836,794 | B1 * | 12/2004 | Lucovsky et al. ......... | 709/223 |
| 6,854,009 | B1 * | 2/2005 | Hughes ................. | 709/220 |
| 6,931,546 | B1 * | 8/2005 | Kouznetsov et al. ....... | 726/23 |
| 7,254,386 | B2 * | 8/2007 | Rajaram ................ | 455/418 |
| 7,322,028 | B2 * | 1/2008 | Belovich ................ | 717/168 |
| 7,350,203 | B2 * | 3/2008 | Jahn .................... | 717/171 |
| 7,376,947 | B2 * | 5/2008 | Evers ................... | 717/174 |
| 7,392,522 | B2 * | 6/2008 | Murray et al. ........... | 717/174 |
| 7,496,911 | B2 * | 2/2009 | Rowley et al. ........... | 717/174 |
| 7,555,749 | B2 * | 6/2009 | Wickham et al. .......... | 717/168 |

OTHER PUBLICATIONS

Han et al, "Secure multicast software delivery", IEEE, pp. 207-212, 2000.*
Mumtaz et al, "Development of a methodology for piracy protection of software installation", IEEE, pp. 1-7, 2009.*
Gkantsidis et al, "Planet scale software updates", ACM SIGCOMM, pp. 423-434, 2006.*
Heiner et al, "Secure software installation in a mobile environment", ACM, pp. 155-156, 2007.*
Montanari et al, "Multi aspect security configuration assessment", ACM SafeConfig, pp. 1-5, 2009.*
Li et al, "Real time security exercise on a realistic interdomain routing experiment platform", ACM/IEEE/SCS PADS, pp. 54-63, 2009.*

* cited by examiner

*Primary Examiner*—Anil Khatri
(74) *Attorney, Agent, or Firm*—Hickman Palermo Truong & Becker LLP

(57) ABSTRACT

A system detects an application attempting to invoke an administrative utility on a target application for installation of software. In response, the system identifies the administrative utility as an installer launcher. The system then detects the installer launcher invoking execution of the target application, and in response, identifies the target application as an installation application. The system allows classification of applications as installer launchers and installation applications and in response to detecting operation of such programs, enforces installation security profiles during their operations that apply varying levels of access to certain system resources that differ from a level of access normally applied during non-installation activities.

25 Claims, 5 Drawing Sheets

METHODS AND APPARATUS FOR SECURING LOCAL APPLICATION EXECUTION

BACKGROUND

Conventional computerized devices, such as personal computers, laptop computers and data communications devices restrict user access to system executables, configuration files and directories, to prevent malicious attacks. However, it is often necessary to give users temporary elevated privileges in order to perform restricted tasks such as installing or uninstalling software packages on the users' own computers. System administrators can grant a user, or a group of users, temporary elevated privileges, through the use of privileged administrator functions or programs such as "sudo" ("superuser do"), when operating in a UNIX® environment. The utility "sudo" operates on a per-command basis, meaning the user only has to type "sudo" before executing a restricted command. For example, a user would type "sudo install.exe" to execute an otherwise restricted installation, called "install.exe". An elevated privilege utility, such as "sudo", gives users the ability to execute some (or all) commands while logged in as a root user on their computer. The utility "sudo" can also restrict which commands a user has access to execute. The utility "sudo" extensively logs all of the tasks performed by users while using "sudo", giving system administrators a clear audit trail of all activities users performed by users while using the "sudo" utility.

SUMMARY

Conventional technologies for providing security to computers and computer networks suffer from a variety of deficiencies. In particular, conventional technologies that provide security to computers and computer networks are limited in that flexibility is needed for individual users (or groups of users) to install software packages on their individual computers without requiring security administrators to install the software packages for them. Security administrators employing network systems that download all necessary software packages to all the computers on the network work well in insuring all computers on the network have the correct revisions of necessary software packages. Uniform downloading of necessary software packages also works well in preventing malicious software packages from being installed on the computer in a network. However, these systems lack the flexibility needed by individual users who need to install software packages on individual computers, while still maintaining the security measures needed to prevent malicious attacks on the individual computer and all the computers in the network.

Embodiments disclosed herein significantly overcome such deficiencies and provide a system that includes a computers system executing a software installation identification process. The software installation identification process detects an application such as a user's shell or login attempting to invoke an administrative utility on a target application for installation of software. In response, the software installation identification process identifies the administrative utility as an installer launcher. When the software installation identification process detects the installer launcher invoking execution of the target application, the software installation identification process identifies the target application as an installation application. Once an application is identified as an installation application, subsequent attempts to execute that application will result in the application being executed with installation security applied in the computer system, since that application is now identified as an installation application.

During an example operation of one embodiment, suppose a user attempts to execute a software installation package, for example, "install.exe", on the user's computer. Suppose, for example, the user is running within a UNIX® environment, and uses a launcher application in an attempt to install some software. The software installation identification process detects that a user (i.e., a user's shell process) attempted to execute the software installation package. The software installation identification process identifies the command as an installer launcher, and logs the event in a system management process. When the command (now identified as an installer launcher) attempts to execute the "install.exe" application, the software installation identification process also verifies "install.exe" is not a suspected virus application. The software installation identification process then identifies the "install.exe" application as an installation application, and logs the event in a system management process. Subsequent attempts to execute the install.exe application using the command will result in the application, "install.exe" being executed while installation security is operative within the computer system. Installation security might, for example, relax restrictions on access to certain system resources such as a registry or certain system files that are normally protected from user modification, and may increase security on other system resources such as restricting network access during the execution of the installation application.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Cisco Systems, Inc., of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system and methods of operation of such a computer system that perform a software installation identification process. The software installation identification process detects an application attempting to invoke an administrative utility on a target application for installation of software. In response, the software installation identification process identifies the administrative utility as an installer launcher. When the software installation identification process detects the installer launcher invoking execution of the target application, the software installation identification process identifies the target application as an installation application and allows the installation to process if the target application has not been identified as a network application and if the target is not a virus containing application. Once an application is identified as an installation application, subsequent attempts to execute that application will result in the application being executed.

Figure 1:
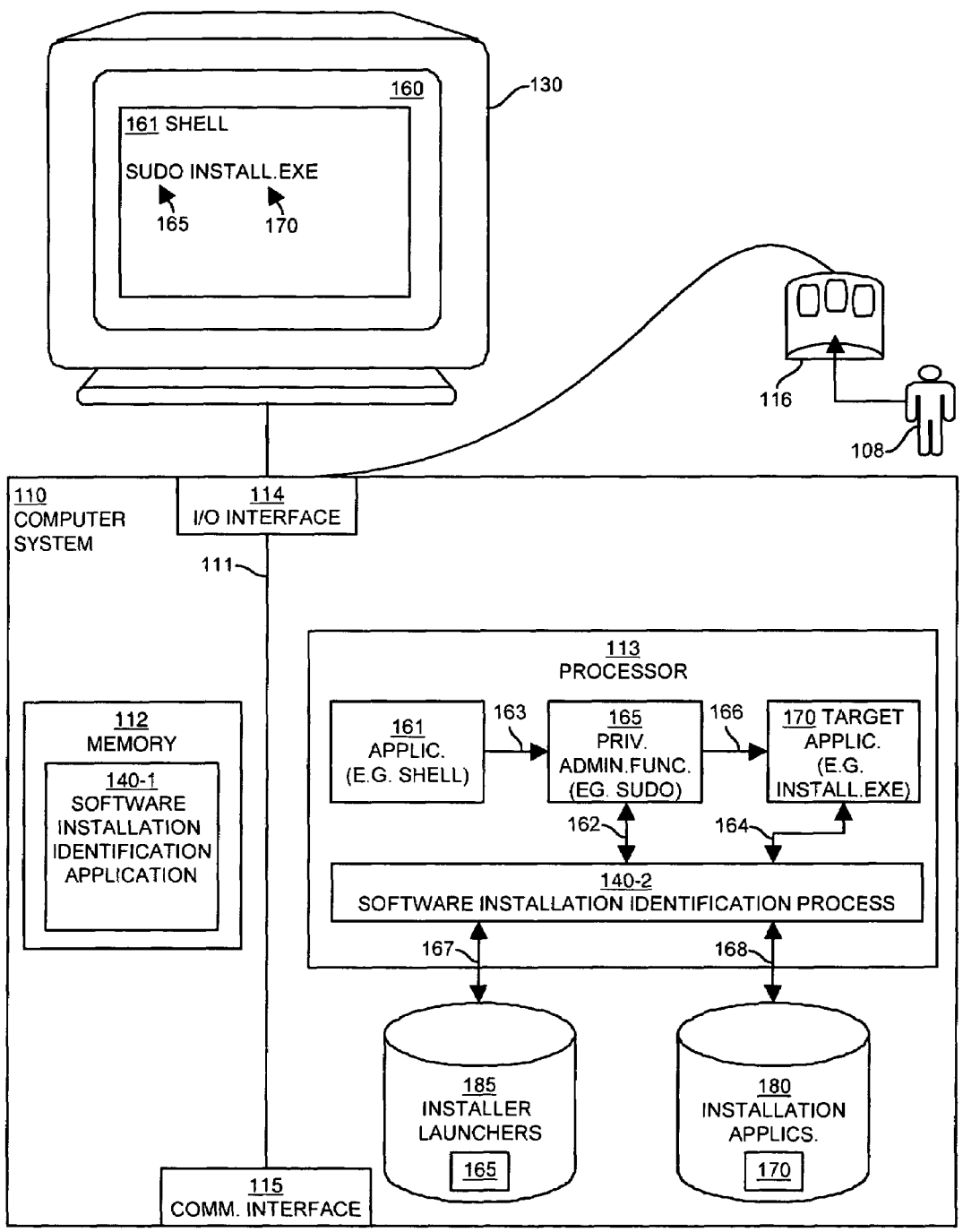
FIG. 1 shows a high-level block diagram of a computer system according to one embodiment disclosed herein.

FIG. 1 is a block diagram illustrating example architecture of a computer system 110 that executes, runs, interprets, operates or otherwise performs a software installation identification 140-1 and software installation identification process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114, and enables a user 108 to provide input commands and generally control the graphical user interface 160 that the software installation identification application 140-1 and process 140-2 provides on the display 130. The software installation identification process 140-2 may be part of a security system that includes a stateful reference monitor that monitors many operations within the computer system 110 to control security. An example of the software installation identification process 140-2 is the Cisco Security Agent product manufactured by Cisco Systems, Inc. of San Jose Calif. The communications interface 115 enables the computer system 110 to communicate with other devices (i.e., other computers) on a network (not shown). This can allow access to the software installation identification application by remote computer systems.

In this example operation of the invention, the graphical user interface 160 displays a command line via a user application 161 such as a user's shell program. The shell program 161 allows the user 108 to invoke 163 an administrative utility 165 such as a utility that in turn invokes 166 a target application 170. The interaction between these processes 161, 165, 170 and 140-2 is shown within the process 113 in this example. For example, the user 108 may have typed "sudo install.exe" into a shell program 161 and the software installation identification process 140-2, pre-configured to monitor 162 all privileged administrator function(s) 165 such as sudo, detects this operation. In response, the software installation identification process 140-2 identifies 167 the administrative utility 165 as an installer launcher 185. The software installation identification process 140-2 thus can maintain a list of installer launchers 185, such as by adding 167 the identification of the sudo program 165 to a class or other data structure 185 to maintain a list of programs that are installer launchers 185. Additionally, the software installation identification process 140-2 checks 164 to make sure that the launcher (e.g., user's shell) of the administrator utility that operates on the target application 170 (install.exe) is not a network application (e.g. has never opened a network connection such as a socket, nor is it a child of a network process) does not contain any known virus or other security problems. In one example, the system tests to make sure that the user's shell is not classified as a network application nor is a descendant of a network application. If these tests 164 pass, the software installation identification process 140-2 identifies 168 the target application 170 as an installation application 180. The software installation identification process 140-2 thus also maintains 168 a classification of installation applications 180, that identifies all programs, processes, or the like that are successfully able to be invoked by the installer launchers 185. Once an installation application has been classified in this manner, a rule engine that maintain information on application classes can use this information to determine if an installation application is executing and can enforce policies that apply to such applications. Once the software installation identification process 140-2 places a program such as the target application 170 on the class of installation applications 180, a user 108 can invoke any installation application 180 in the future without use of the installer launcher program 165.

The memory system 112 is any type of computer readable medium, and in this example, is encoded with a software installation identification application 140-1 that identifies software installation-related programs as explained herein. The software installation identification application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the software installation identification application 140-1. Execution of software installation identification application 140-1 in this manner produces processing functionality in a software installation identification process 140-2. In other words, the software installation identification process 140-2 represents one or more portions or runtime instances of the software installation identification application 140-1 (or the entire software installation identification application 140-1) performing or executing within or upon the processor 113 in the computerized device 110 at runtime.

It is noted that example configurations disclosed herein include the software installation identification application 140-1 itself in the form of un-executed or non-performing logic instructions and/or data. The software installation identification application 140-1 may be stored on a computer readable medium (such as a floppy disk), hard disk, electronic, magnetic, optical, or other computer readable medium. The software installation identification application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the software installation identification application 140-1 in the processor 113 as the software installation identification process 140-2. Those skilled in the art will understand that the computer system 110 may include other processes and/or software and hardware components, such as an operating system not shown in this example.

Further details of operation of configurations explained herein will now be provided with respect to a flow chart of processing steps that show the high level operations disclosed herein to perform the software installation identification process 140-2.

Figure 2:
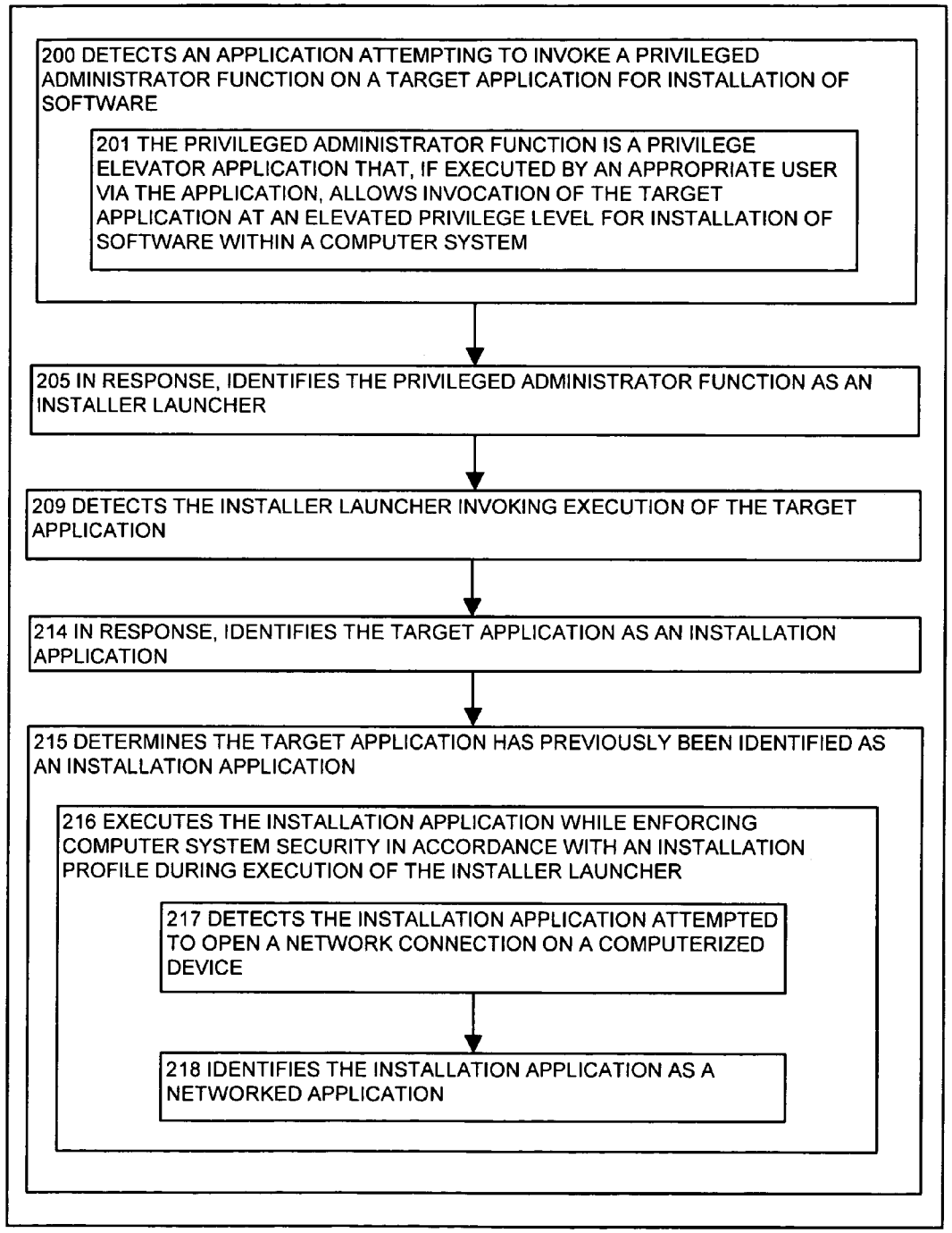
FIG. 2 illustrates a flowchart of a procedure performed by the system of FIG. 1 when the software installation identification process detects an application attempting to invoke an administrative utility on a target application for installation of software, according to one embodiment disclosed herein.

FIG. 2 is a flowchart of the steps performed by the software installation identification process 140-2 when it detects an application 161 attempting to invoke an administrative utility 165. An administrative utility 165 is used to allow a user 108 to perform a function such as execution of an installation application 170 that a security administrator would not otherwise allow the user 108 to perform, as part of a host intrusion prevention system.

In step 200, the software installation identification process 140-2 detects 162 an application 161 attempting to invoke 163, 166 an administrative utility 165 on a target application 170 for installation of software. The application 161 attempting to invoke 163 the administrative utility 165 on the target application 170 (via 166) could be a user 108 invoking an administrative utility 165, on a target application 170, such as "install.exe" (meaning the user 108 types "sudo install.exe" at the command line of the graphical user interface 160). The application attempting to invoke the administrative utility 165 on the target application 170 could also be an automated process invoking the administrative utility 165 on the target application 170.

In step 201, the administrative utility 165 is a privilege elevator application that, if executed by an appropriate user 108 via the application 161, allows invocation 166 of the target application 170 at an elevated privilege level for installation of software within the computer system 110. For a UNIX® based system, the administrative utility 165 could be the "sudo" (i.e., "superuser do") command.

In step 205, the software installation identification process 140-2 in response to detecting an application attempting to invoke an administrative utility 165 on a target application 170 for installation of software, identifies 162, 167 the administrative utility 165 as an installation launcher 185. In one embodiment, the installation launcher 185 is a class of administrative utility 165 that is granted elevated privileges within the security system of the computer system 110.

In step 209, the software installation identification process 140-2 detects the installation launcher 185 invoking execution of the target application 170. Once the administrative utility 165 has been identified as an installation launcher 185, the administrative utility 165 invokes execution of the target application 170.

In step 214, in response to the software installation identification process 140-2 detecting the installation launcher 185 invoking execution of the target application 170, the software installation identification process 140-2 identifies 164, 168 the target application 170 as an installation application 180. Once a target application 170 has been identified 168 as an installation application 180, subsequent attempts to execute the target application 170 will result in the target application 170 being allowed to execute without the target application 170 having to go through the steps of being identified as an installation application 180 by the software installation identification process 140-2.

In step 215, the software installation identification process 140-2 determines the target application 170 has previously been identified as an installation application 180. In one embodiment, the software installation identification process 140-2 identifies the target application 170 as a process in the installation application 180 classification.

In step 216, the software installation identification process 140-2 executes the installation application 180 while enforcing computer system security in accordance with an installation profile during execution of the installation launcher 185. Enforcement of an installation profile might, for example, relax restrictions on access to certain system resources such as a registry or certain system or host files that are normally protected from user modification, and may increase security on other system resources such as restricting network access (e.g., use of email) during the execution of a specific installation application in the class of installation applications 180.

In one configuration, a security administrator, overseeing security on the computer system 110 and a network of which the computer system 110 is networked into, sets policy rules for the target application 170. In another configuration, the security administrator sets one set of policy rules for target applications 170 and different set of policy rules for child processes of target applications 170.

In step 217, the software installation identification process 140-2 detects the installation application 180 attempted to open a network connection on a computerized device. In one configuration, the software installation identification process 140-2 detects that the executing installation application 180 has attempted to open a network connection on a computerized device (i.e., either the computer system 110, or another computer system), during execution of the installation application 180.

In step 218, the software installation identification process 140-2 identifies the installation application 180 as a networked application, the networked application being an application that has attempted to open a network connection on a computerized device. Once the software installation identification process 140-2 has identified the installation application 180 as an application that has attempted to open a network connection on a computerized device, the software installation identification process 140-2 classifies the installation application 180 as a networked application.

Figure 3:
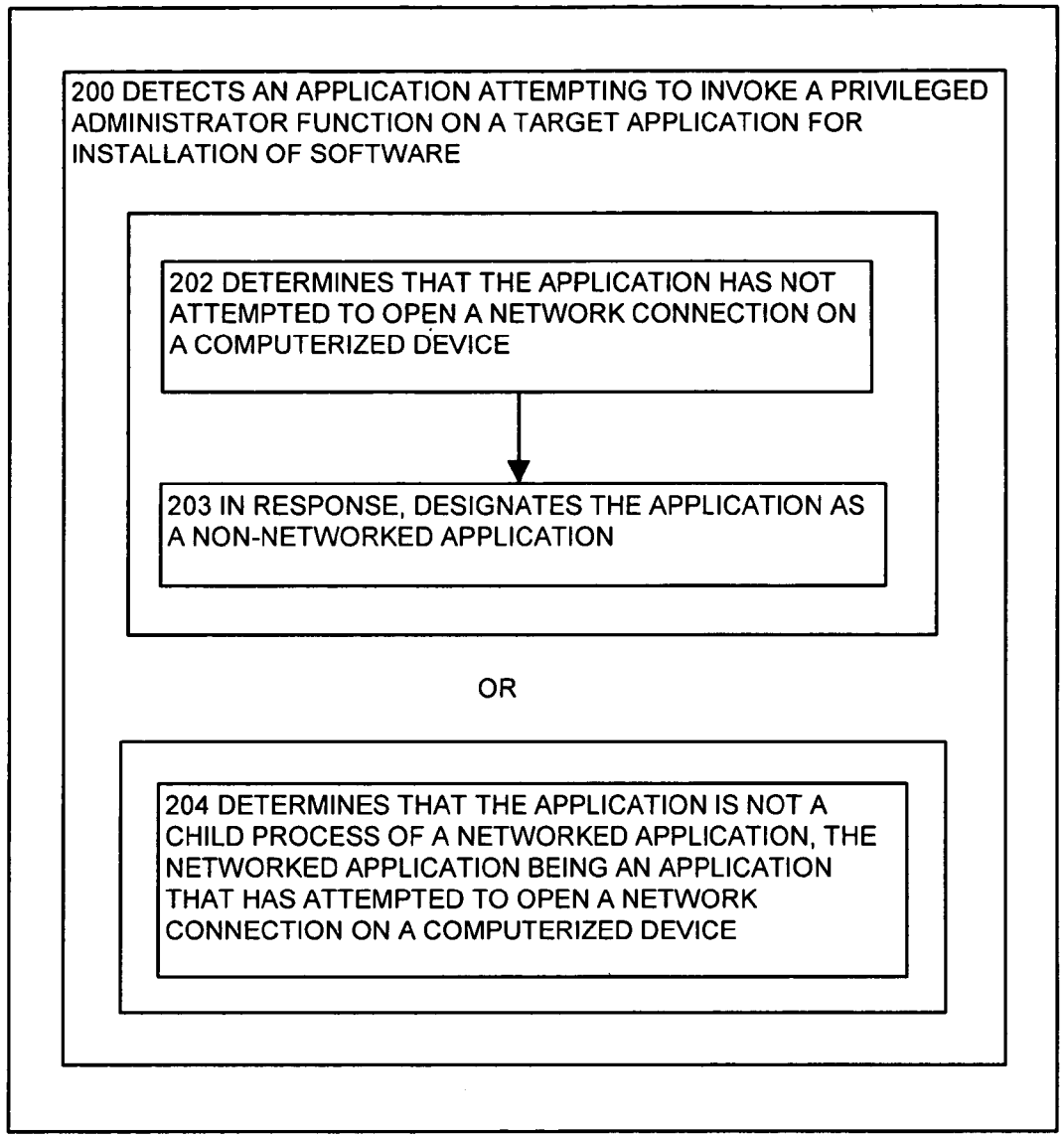
FIG. 3 illustrates a flowchart of a procedure performed by the system of FIG. 1 when the software installation identification process detects an application attempting to invoke an administrative utility on a target application for installation of software, according to one embodiment disclosed herein.

FIG. 3 is a flowchart of the steps performed by the software installation identification process 140-2 when it detects an application 161 attempting to invoke an administrative utility 165. The software installation identification process 140-2 classifies networked applications differently from not networked applications. Any application the software installation identification process 140-2 classifies as a networked application, or a child of a networked application will not be identified as an installation application 180.

In step 202, the software installation identification process 140-2 determines that the application has not attempted to open a network connection on a computerized device. The software installation identification process 140-2 determines that any previous executions of the application have not attempted to open a network connection on a computerized device.

In step 203, the software installation identification process 140-2, in response to determining that the application has not attempted to open a network connection on a computerized device, designates the application as a non-networked application.

Alternatively, in one configuration, in step 204, the software installation identification process 140-2 determines that the application is not a child process of a networked application, the networked application being an application that has attempted to open a network connection on a computerized device. An application that has not been classified as a networked application or has not been classified as a child of a networked application can be classified as a non-networked application.

Figure 4:
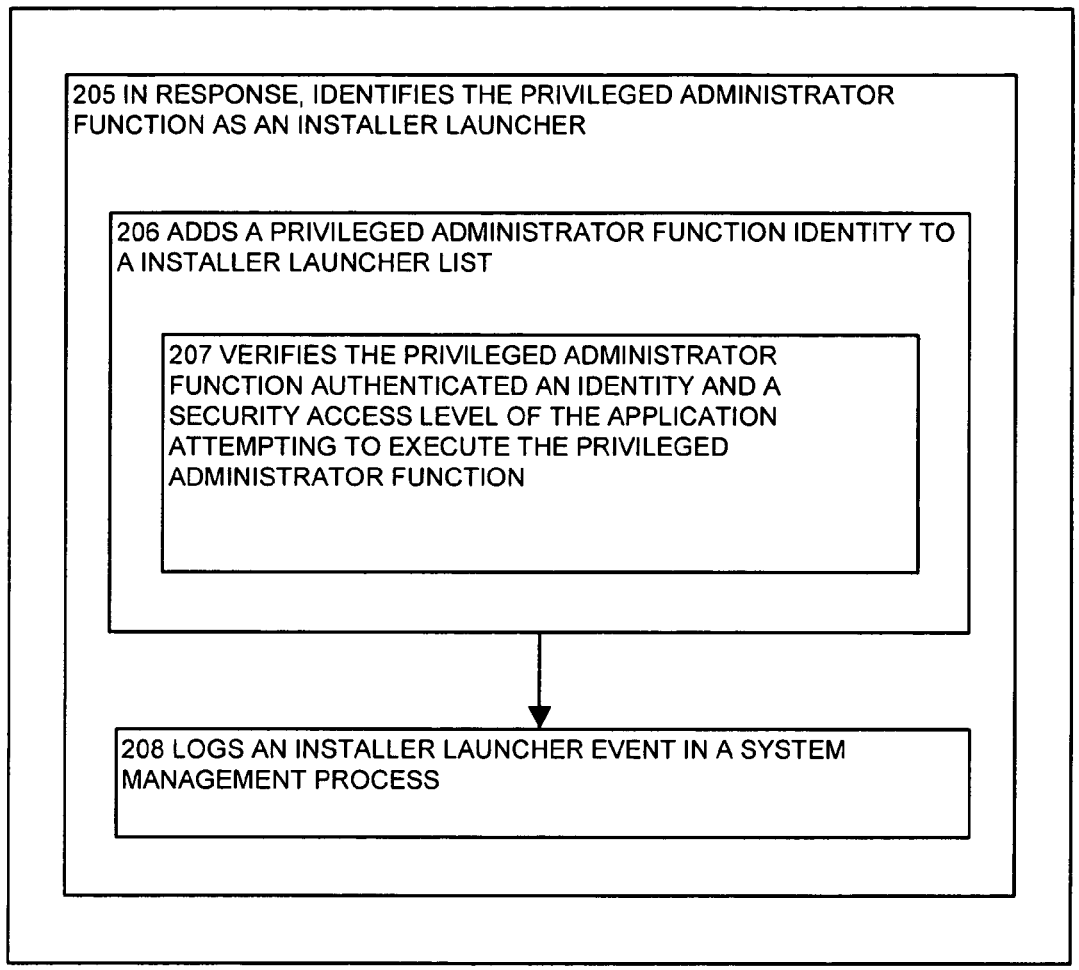
FIG. 4 illustrates a flowchart of a procedure performed by the system of FIG. 1 when the software installation identification process identifies the administrative utility as an installer launcher, according to one embodiment disclosed herein.

FIG. 4 is a flowchart of the steps performed by the software installation identification process 140-2 when, in response to the software installation identification process 140-2 detecting an application attempting to invoke an administrative utility 165 on a target application 170 for installation of software, identifies the administrative utility 165 as an installation launcher 185.

In step 206, the software installation identification process 140-2 adds an administrative utility identity to an installer launcher list. In one configuration, the installer launcher list is a class, and the administrative utility identity is added to the installer launcher class.

In step 207, the software installation identification process 140-2 verifies the administrative utility 165 authenticated an identity and a security access level of the application attempting to execute the administrative utility 165. In one configuration, the administrative utility 165 is the command "sudo", running within a UNIX® environment. When the "sudo" command is executed, it executes its own password authentication process, verifying the user 108 has the necessary privileges to execute the target application 170.

In step 208, the software installation identification process 140-2 logs an installer launcher event in a system management process. Once the software installation identification process 140-2 adds the administrative utility 165 to the installation launcher 185, the installer launcher event is logged in a system management process.

Figure 5:
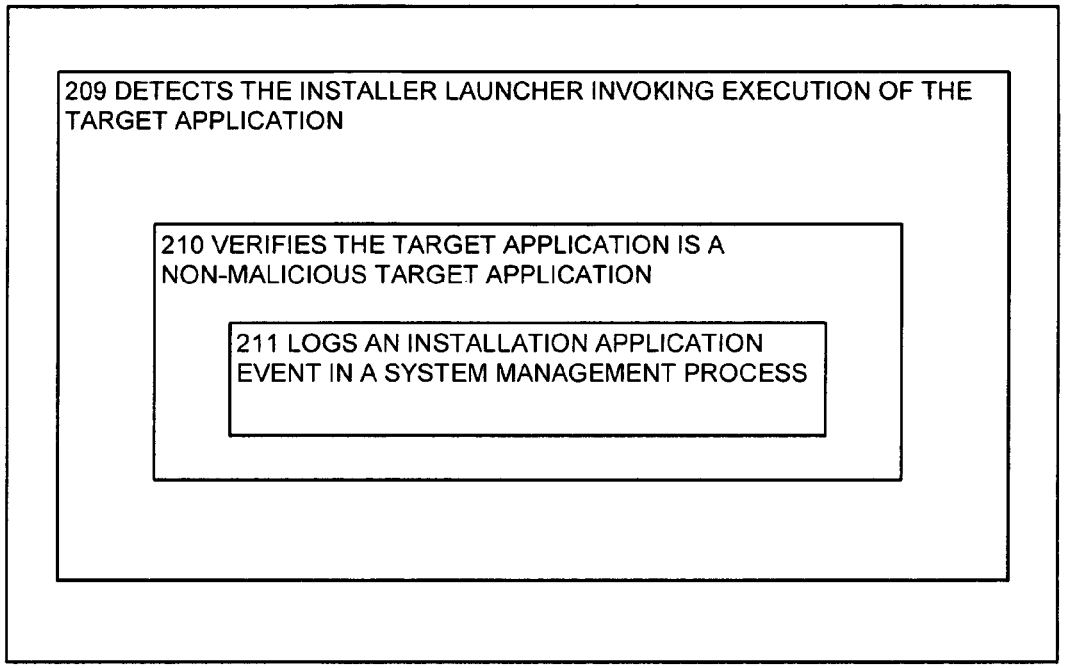
FIG. 5 illustrates a flowchart of a procedure performed by the system of FIG. 1 when the software installation identification process detects the installer launcher invoking execution of the target application, according to one embodiment disclosed herein.

FIG. 5 is a flowchart of the steps performed by the software installation identification process 140-2 when it detects the installation launcher 185 invoking execution of the target application 170. The software installation identification process 140-2 has identified the administrative utility 165 as an installation launcher 185, and the installation launcher 185 invokes the target application 170.

In step 210, the software installation identification process 140-2 verifies the target application 170 is a non-malicious target application. The software installation identification process 140-2 verifies the target application 170 is not classified as malicious target application, or is not a member of a suspected malicious class.

In step 211, the software installation identification process 140-2 logs an installation application event in a system management process. The software installation identification process 140-2 logs the installation application event after verifying the target application 170 is not classified as a malicious target application.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method for identifying software installation-related programs in a computerized device, the method comprising:
   identifying an administrative utility as an installer launcher, in response to:
      detecting an application invoking the administrative utility on a target application for installation of software in the computerized device; and
      detecting that the application is a non-networked application by determining that the application has never opened a network connection;
   identifying the target application as an installation application, in response to detecting the installer launcher invoking execution of the target application;
   wherein the method is performed on a processor in the computerized device.

2. The method of claim 1, where the administrative utility is a privilege elevator application that, when executed by an authorized user via the application, provides invocation of the target application at an elevated privilege level for installation of software in the computerized device.

3. The method of claim 1, comprising:
   in response to determining the target application has previously been identified as an installation application,
   executing the installation application while enforcing a security policy in accordance with an installation profile during execution of the installer launcher,
   wherein enforcement of the installation profile provides a less restricted level of access to a first set of system resources that are normally more restricted when a non-installation profile is enforced in the computerized device, and
   providing a more restricted level of access to a second set of system resources that are normally less restricted when a non-installation profile is enforced in the computerized device.

4. The method of claim 3, where executing the installation application comprises:
   detecting an attempt by the installation application to open a network connection on a computerized device; and
   in response to detecting the attempt identifying the installation application as a networked application.

5. The method of claim 1, where detecting an application invoking an administrative utility on a target application comprises:

determining that the application has not attempted to open a network connection on a computerized device; and in response, designating the application as a non-networked application.

6. The method of claim 1, where detecting an application invoking an administrative utility on a target application comprises:

determining that the application is not a child process of a networked application, where the networked application is an application that has attempted to open a network connection on the computerized device.

7. The method of claim 1, where identifying the administrative utility as an installer launcher comprises:

adding the administrative utility to an installer launcher list; and logging an installer launcher event in a system management process.

8. The method of claim 7, where adding the administrative utility to an installer launcher list comprises:

verifying the administrative utility authenticated an identity and a security access level of the application invoking the administrative utility.

9. The method of claim 1, where detecting the installer launcher invoking execution of the target application comprises:

verifying the target application is a non-malicious target application.

10. The method of claim 9, comprising:

logging an installation application event in a system management process.

11. A method for identifying software installation-related programs, the method comprising:

detecting an application invoking an administrative utility on a target application for installation of software;

determining that the application has not attempted to open a network connection on a computerized device;

determining the application is not a child process of a networked application, the networked application being an application that has attempted to open a network connection on the computerized device;

identifying the administrative utility as an installer launcher;

verifying the administrative utility authenticated an identity and a security access level of the application executing the administrative utility;

detecting the installer launcher attempting to invoke the target application;

verifying the target application is a non-malicious target application;

identifying the target application as an installation application;

executing the target application;

wherein the method is performed on a processor in the computerized device.

12. A computerized device comprising:

a memory;

a processor;

a communications interface;

an interconnection mechanism coupling the memory, the processor and the communications interface;

where the memory is encoded with a software installation identification application that when executed on the processor identifies software installation-related programs on the computerized device by performing the operations of:

detecting an application invoking an administrative utility on a target application for installation of software;

detecting that the application is a non-networked application by determining that the application has never opened a network connection;

in response to detecting the application invoking the administrative utility and in response to detecting that the application is a non-networked application, identifying the administrative utility as an installer launcher;

detecting the installer launcher invoking execution of the target application; and in response to detecting the installer launcher invoking execution of the target application, identifying the target application as an installation application.

13. The computerized device of claim 12 wherein the administrative utility is a privilege elevator application that, if executed by an appropriate user via the application, allows invocation of the target application at an elevated privilege level for installation of software within a computer system.

14. The computerized device of claim 12 wherein the computerized device performs the operations of:

determining the target application has previously been identified as an installation application; and executing the installation application while enforcing computer system security in accordance with an installation profile during execution of the installer launcher, enforcement of the installation profile allowing a less restricted level of access to a first set of system resources that are normally more restricted when a non-installation profile is being enforced in the computerized device, and allowing a more restricted level of access to a second set of system resources that are normally less restricted when a non-installation profile is being enforced in the computerized device.

15. The computerized device of claim 14 wherein when the computerized device performs the operation of executing the installation application, the computerized device performs the operations of:

detecting the installation application attempted to open a network connection on a computerized device; and identifying the installation application as a networked application.

16. The computerized device of claim 12 wherein when the computerized device performs the operation of detecting an application invoking an administrative utility on a target application, the computerized device performs the operations of:

determining that the application has not attempted to open a network connection on a computerized device; and in response, designating the application as a non-networked application.

17. The computerized device of claim 12 wherein when the computerized device performs the operation of detecting an application invoking an administrative utility on a target application, the computerized device performs the operation of:

determining that the application is not a child process of a networked application, the networked application being an application that has attempted to open a network connection on a computerized device.

18. The computerized device of claim 12 wherein when the computerized device performs the operation of identifying the administrative utility as an installer launcher, the computerized device performs the operations of:

adding an administrative utility identity to a installer launcher list; and logging an installer launcher event in a system management process.

19. The computerized device of claim 18 wherein when the computerized device performs the operation of adding an administrative utility identity to an installer launcher list, the computerized device performs the operation of:
  verifying the administrative utility authenticated an identity and a security access level of the application invoking the administrative utility.

20. The computerized device of claim 12 wherein when the computerized device performs the operation of detecting the installer launcher invoking execution of the target application, the computerized device performs the operation of:
  verifying the target application is a non-malicious target application.

21. The computerized device of claim 20 wherein the computerized device performs the operation of:
  logging an installation application event in a system management process.

22. A computerized device comprising:
  a memory;
  a processor;
  a communications interface;
  an interconnection mechanism coupling the memory, the processor and the communications interface;
  where the memory is encoded with a software installation identification application that when executed on the processor identifies software installation-related programs on the computerized device by performing the operations of:
    detecting an application invoking an administrative utility on a target application for installation of software;
    determining that the application has not attempted to open a network connection on a computerized device;
    determining the application is not a child process of a networked application, the networked application being an application that has attempted to open a network connection on a computerized device;
    identifying the administrative utility as an installer launcher;
    verifying the administrative utility authenticated an identity and a security access level of the application executing the privileged administrator function;
    detecting the installer launcher attempting to invoke the target application;
    verifying the target application is a non-malicious target application;
    identifying the target application as an installation application; and
    executing the installation application.

23. A computer readable storage medium encoded with computer programming logic that when executed on a processor in a computerized device produces a software installation identification process that identifies software installation-related programs on the computerized device by causing the computerized device to perform the operations of:
  detecting an application invoking an administrative utility on a target application for installation of software, wherein invoking the administrative utility is a privileged administrative function;
  detecting that the application is a non-networked application by determining that the application has never opened a network connection;
  in response to detecting the application invoking the administrative utility and in response to detecting that the application is a non-networked application, identifying the administrative utility as an installer launcher;
  detecting the installer launcher invoking execution of the target application; and
  in response to detecting the installer launcher invoking execution of the target application, identifying the target application as an installation application.

24. A computerized device comprising:
  a memory;
  a processor;
  a communications interface;
  an interconnection mechanism coupling the memory, the processor and the communications interface;
  where the memory is encoded with a software installation identification application that when executed on the processor produces a software installation identification process that configures the computerized device with a means for identifying software installation-related programs on the computerized device, the means including:
    means for detecting an application invoking an administrative utility on a target application for installation of software, wherein invoking the administrative utility is a privileged administrative function;
    means for detecting that the application is a non-networked application by determining that the application has never opened a network connection;
    in response to detecting the application invoking the administrative utility and in response to detecting that the application is a non-networked application, means for identifying the administrative utility as an installer launcher;
    means for detecting the installer launcher invoking execution of the target application; and
    in response to detecting the installer launcher invoking execution of the target application, means for identifying the target application as an installation application.

25. A computerized device comprising:
  a memory;
  a processor;
  a communications interface;
  an interconnection mechanism coupling the memory, the processor and the communications interface;
  where the memory is encoded with a software installation identification application that when executed on the processor produces a software installation identification process that configures the computerized device with a means for identifying software installation-related programs on the computerized device, the means including:
    means for detecting an application invoking an administrative utility on a target application for installation of software;
    means for determining that the application has not attempted to open a network connection on a computerized device;
    means for determining the application is not a child process of a networked application, the networked application being an application that has attempted to open a network connection on a computerized device;
    means for identifying the administrative utility as an installer launcher;
    means for verifying the administrative utility authenticated an identity and a security access level of the application executing the privileged administrator function;
    means for detecting the installer launcher attempting to invoke the target application;
    means for verifying the target application is a non-malicious target application;
    means for identifying the target application as an installation application; and
    means for executing the installation application.

* * * * *